(12) United States Patent
Webster et al.

(10) Patent No.: US 8,510,402 B2
(45) Date of Patent: Aug. 13, 2013

(54) MANAGEMENT OF REDUNDANT ADDRESSES IN STANDBY SYSTEMS

(75) Inventors: Steve Webster, Raymond, NH (US); Julien Duquesnay, Somerville, MA (US); Vibha Shahi, N. Andover, MA (US)

(73) Assignee: Schneider Automation Inc., North Andover, MA (US)

( * ) Notice: Subject to any disclaimer, the term of this patent is extended or adjusted under 35 U.S.C. 154(b) by 685 days.

(21) Appl. No.: 12/194,788

(22) Filed: Aug. 20, 2008

(65) Prior Publication Data
US 2010/0049871 A1    Feb. 25, 2010

(51) Int. Cl.
*G06F 15/16*     (2006.01)

(52) U.S. Cl.
USPC .............................................. 709/209

(58) Field of Classification Search
USPC .............................................. 709/209
See application file for complete search history.

(56) References Cited

U.S. PATENT DOCUMENTS

| | | | |
|---|---|---|---|
| 6,434,157 B1 | 8/2002 | Dube' et al. | |
| 6,968,242 B1 | 11/2005 | Hwu et al. | |
| 6,996,502 B2* | 2/2006 | De La Cruz et al. | 702/188 |
| 7,032,029 B1 | 4/2006 | Tanzman et al. | |
| 7,120,683 B2* | 10/2006 | Huang | 709/223 |
| 7,801,150 B1* | 9/2010 | Rupavatharam | 370/395.32 |
| 2001/0052084 A1* | 12/2001 | Huang et al. | 714/4 |
| 2005/0027812 A1* | 2/2005 | Bozak et al. | 709/208 |
| 2005/0027813 A1* | 2/2005 | Bozak et al. | 709/208 |
| 2005/0055418 A1* | 3/2005 | Blanc et al. | 709/209 |
| 2005/0159927 A1* | 7/2005 | Cruz et al. | 702/188 |
| 2005/0172161 A1* | 8/2005 | Cruz et al. | 714/4 |
| 2007/0076727 A1* | 4/2007 | Shei | 370/401 |
| 2008/0066082 A1* | 3/2008 | Choi | 719/318 |

OTHER PUBLICATIONS

Chen, I-R; Bastani, F.B., Warm standby in hierarchically structured process-control programs, Aug. 1994, IEEE Transactions on Software Engineering, vol. 20, Issue: 8, pp. 658-663.*

* cited by examiner

*Primary Examiner* — Alicia Baturay
(74) *Attorney, Agent, or Firm* — Banner & Witcoff, Ltd.

(57) ABSTRACT

Aspects of the invention provide apparatuses, systems, and computer readable media for supporting redundant network management. When the primary device (101, 103) fails, its Ethernet IP address is transferred or controlled by a backup Ethernet device. System information is provided to a network adapter so that programmable logic controllers are in agreement about the mode of operation. A central processing unit (201, 203) determines a calculated mode of operation from the operational statuses of the programmable logic controller and the mated programmable logic controller. The central processing unit provides an address indication (503) based on the calculated mode of operation and a selection indication (501) that is indicative of a selected address criterion. The corresponding network adapter determines the assigned network address from the selection indication and the address indication.

23 Claims, 8 Drawing Sheets

| bit | | |
|---|---|---|
| 0 | ThisPLCMode | 01 offline. 10 primary running. 11 stand by running |
| 1 | | |
| 2 | OtherPLCMode | 01 offline. 10 primary running. 11 stand by running |
| 3 | | |
| 4 | LogicMismatch | If 0 PLC have matching logic |
| 5 | PlcSet | If 0 PLC is set as unit A. If 1 PLC is set as Unit B |
| 6 | Unused | |
| 7 | OSversionmismatch | 0 OK, 1 version mismatch on a checked component |
| 8 | CoproVersionmismatch | 0 OK, 1 version mismatch on a checked component |
| 9 | Unused | |
| 10 | Unused | |
| 11 | Unused | |
| 12 | IsIPValid | 0 bit 13th is not significant |
| 13 | IPAddress | 0=IP 1= IP+1 |
| 14 | UnlocVar | If 0 Unlocated Variables is being transferred |
| 15 | Healthy | If 0 Copro interface is healthy |

| Scenario | ETY A | ETY B | Action | Result |
|---|---|---|---|---|
| Case 1 | Primary | Offline or Undefined | Primary Sends a UDP Status Message Every 10 Msec | ETY A Reports to the Local PLC that the Standby Unit has Failed |
| Case 2 | Primary | Standby | Primary Sends a UDP Status Message Every 10 Msec | ETY A Sends and Receives UDP Status Message to/from ETY B (Normal Operation) |
| Case 3 | Primary Fails | Standby | The Standby Reports to the Local PLC that the Primary Unit Communication has Failed. | ETY B Waits for Command from the Local PLC to Become the Primary. |
| Case 4 | Primary | Standby Fails | Primary Sends a UDP Status Message Every 10 Msec | ETY A Reports to the Local PLC that the Standby Unit has Failed. |
| Case 5 | Offline | Standby | Illegal State (Temporary Condition) | ETY B Waits for Command from the Local PLC to Become the Primary. |
| Case 6 | Offline or Unassigned | Offline or Unassigned | No Action | UDP Message Not Started |

FIG. 8

MANAGEMENT OF REDUNDANT ADDRESSES IN STANDBY SYSTEMS

BACKGROUND

Factory automation systems are increasingly being integrated with communication networks. Control systems are being implemented on networks for remote monitoring and control of devices, processes, etc. System failures involving the primary mode controller that can shut down the control system are avoided by having a back-up controller readily available in hot/active standby mode to replace the failing primary mode controller.

Controllers such as programmable logic controllers (PLC) have been implemented in duplex or back-up system configurations where downtime of a system cannot be tolerated. Such a control system delivers high reliability through redundancy. Generally, the duplex configuration incorporates a pair of PLC's assembled in a hot or active standby configuration, where one PLC is operating in a primary mode and the other PLC is functioning in a secondary or standby/backup mode. The primary controller runs an application by scanning a user program to control and monitor a remote input/output (I/O) network. The other (secondary) controller acts as the active standby controller. The standby controller does not run the application and does not operate the remote I/O devices. The standby controller is updated by the primary controller with each scan. The standby controller is then ready to assume control of the control system within one scan if the primary controller fails to operate or is removed from operation.

The primary and secondary controllers are interchangeable and can be swapped or switched when desired. Either controller can be placed in the primary state. The active standby configuration requires the non-primary controller to be placed in the standby mode to secure the system's redundancy. The controllers continuously communicate with each other to ensure the operability of the control system. The communication among the controllers is used to determine if a swap of the controllers should be initiated due to a system failure or by election of an operator.

With a redundant system, one programmable logic control should operate in the primary state while the other programmable logic controller should operate in the standby state when the system experiences different operating scenarios. If operating scenarios exist where the programmable logic controllers do assume non-complementary states (e.g., both PLC's attempt to be primary) the redundant system may not function in a desirable fashion.

SUMMARY

An aspect of the invention provides apparatuses, computer-readable media, and systems for supporting redundant network (e.g., Ethernet) management. When the primary device (controlling device) fails, its Ethernet IP address is transferred or controlled by a backup Ethernet device. System information is provided to a network adapter so that programmable logic controllers are in agreement about the mode of operation. Consequently, programmable logic controllers do not assume the same operation mode, e.g., where both programmable logic controllers attempt to be the primary device.

With another aspect of the invention, a programmable logic controller includes a central processing unit that determines a calculated mode of operation from the operational statuses of the programmable logic controller and the mated programmable logic controller. The central processing unit provides an address indication based on the calculated mode of operation and a selection indication that is indicative of a selected address criterion. The corresponding network adapter determines the assigned network address from the selection indication and the address indication.

With another aspect of the invention, when utilizing a first address criterion, the network adapter determines the assigned network address from the operational status. When utilizing a second address criterion, the network adapter determines the assigned network address from the address indication.

With another aspect of the invention, a network adapter obtains I/O and cabling information from a network adapter in the mated programmable logic controller and sends the status information to the associated central processing unit. The central processing unit utilizes the status information in determining the calculated mode of operation.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 5 shows a system status word sent from the central processing unit and a network adapter of a programmable logic controller according to an embodiment of the invention.

FIG. 8 shows messaging scenarios between network adapters in an active standby system according to an embodiment of the invention.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
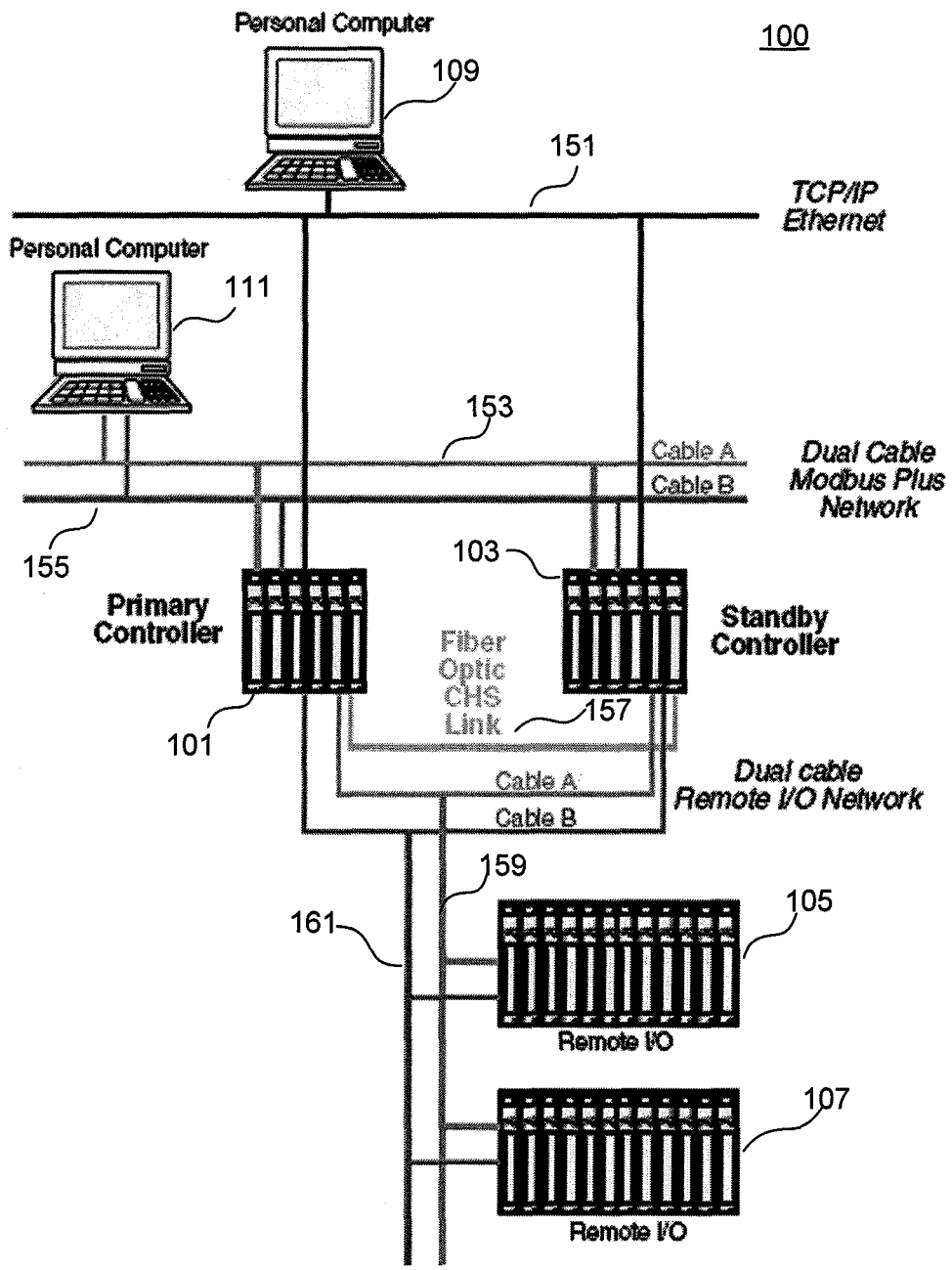
FIG. 1 shows a control system having a hot standby capability according to an embodiment of the invention.

FIG. 1 shows control system 100 having a hot standby capability according to an embodiment of the invention. Two identically configured programmable logic controllers (PLC's) 101 and 103 communicate with each other via the hot standby option processor located in each programmable logic controller over fiber optic link 157. Fiber optic link 157 may support one of different protocols, including Ethernet and High-Level Data Link Control (HDLC) at layer 2 of the OSI model. One of the programmable logic controllers typically acts as the primary controller, while the other programmable logic controller is in standby mode (corresponding to the secondary controller). The standby controller is able to take ownership of remote I/O links 159 and 161, which communicate with remote I/O devices 105 and 107. A user communicates and controls programmable logic controllers 101 and 103 from computers 109 and 111 over links 151, 153, and 155. With an embodiment, links 151, 153, and 155 operate in accordance with Transmission Control Protocol/Internet Protocol (TCP/IP) over an Ethernet network.

With an aspect of the invention, control system 100 may support one of different types of standby configurations, including hot standby, warm standby, and cold standby. With a hot standby configuration, redundancy is supported, in which the primary and secondary (i.e., backup) systems run simultaneously. The data is mirrored to the secondary server in real time so that both systems contain identical information. With a warm standby configuration, the secondary (i.e., backup) system runs in the background of the primary system. Data is mirrored to the secondary system at regular intervals, which means that there are times when both systems do not contain the exact same data. A cold standby configuration supports redundancy in which the secondary system is only called upon when the primary system fails. The system on cold standby receives scheduled data backups, but less frequently than a warm standby. Cold standby systems are often used for non-critical applications or in cases where data is changed infrequently.

Figure 2:
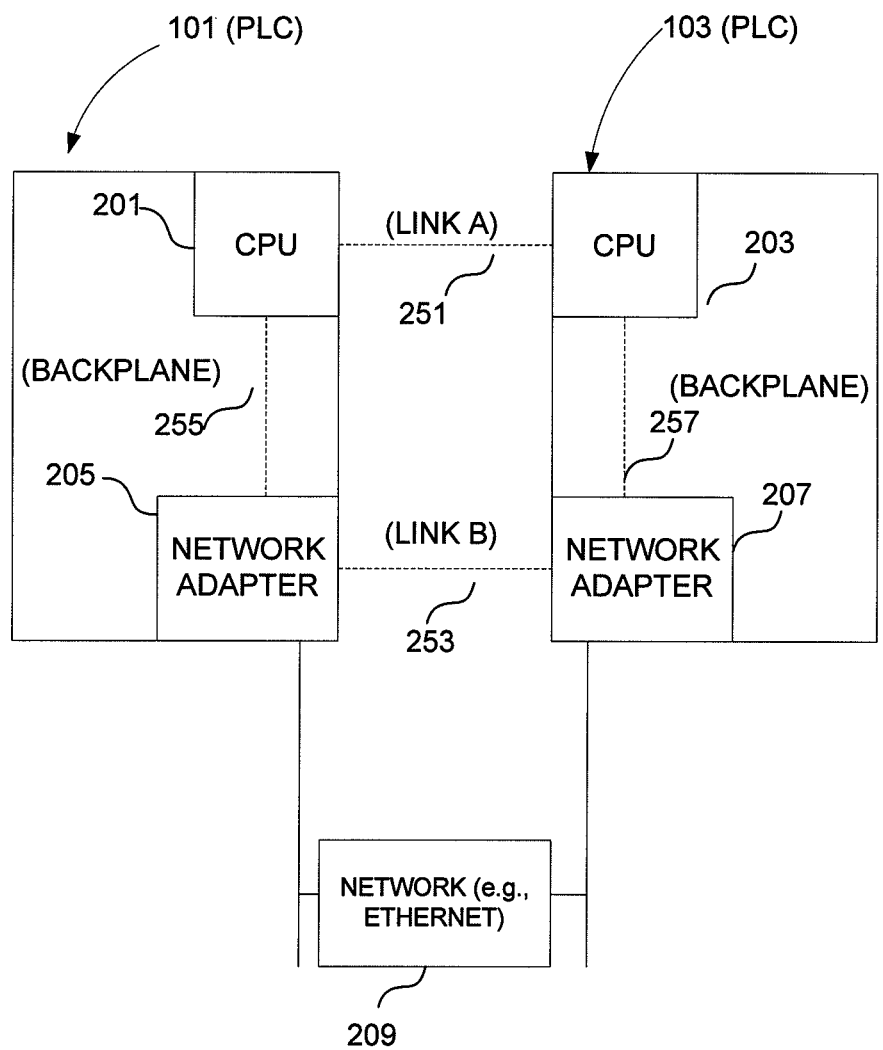
FIG. 2 shows a block diagram of an active standby control system according to an embodiment of the invention.

FIG. 2 shows block diagram 200 of an active standby control system according to an embodiment of the invention. Block diagram 200 may correspond to control system 100 that operates in a hot standby, warm standby, or cold standby configuration.

Programmable logic controllers (PLC) 101 and 103 are integrated with control systems in an active, hot standby or backup configuration where the primary controller (either PLC 101 or 103) can be swapped or exchanged by operator personnel with a readily available backup controller when a failure to the primary controller is detected. Factory automation networks typically allow operator personnel to monitor the control system from a remote site. In the active standby configuration, programmable logic controllers 101 and 103 are arranged in communication with each other. One of the controllers is designated a primary controller and is active on the network while the other controller is in a hot standby mode for backing up the primary controller. If the primary controller fails or is taken out of service, the backup controller will be swapped in its place.

System 200 provides, via the network adapters 205 and 207, a connection to network 209, which may support Ethernet and TCP/IP. The primary programmable logic controller has a configured network address (typically equal to IP) and the standby programmable logic controller has another network address (typically equal to IP+1). In case of swap in system 200 (e.g., if a failure occurs in the primary programmable logic controller), the IP address of network adapters 205 and 207 are also swapped. This approach may be used to keep the control of system 200 when swapping occurs.

With an embodiment, network adapters 205 and 207 manage network addresses. Network address identifiers, which are assigned to network adapter 205 and network adapter 207, may be based on the standby status of the associated PLC. Each network adapter on the network 209 is assigned a network address identifier, e.g., an Internet Protocol (IP) address. Thus, the change of the primary programmable logic controller in the network also requires the exchange of its assigned IP address. With an embodiment, the network adapter of the primary programmable logic controller is assigned network address=IP, and the network adapter of the secondary (standby) programmable logic controller is assigned network address=IP+1. If programmable logic controller 101 and programmable logic controller 103 switch (swap) modes (e.g., programmable logic controller 101 was primary and programmable logic controller 103 was secondary, and programmable logic controller 103 becomes primary and programmable logic controller 101 becomes secondary), the network address of the new primary is the same as the network address of the old primary.

Programmable logic controllers 101 and 103 are operably connected to network 209. Network 209 may support different protocols including Ethernet with Transmission Control Protocol/Internet Protocol (TCP/IP) and User Datagram Protocol/Internet Protocol UDP/IP in a hot standby configuration. Each programmable logic controller 101 and 103 includes a central processing unit (control module) 201 or 203, respectively, and a remote I/O head (not explicitly shown in FIG. 2 but shown as being connected to each other and to remote IO devices 105 and 107 through cables 159 and 161 as shown in FIG. 1). Also, while not explicitly shown, each programmable controller 101 and 103 may include a hot standby control module.

Each central processing unit 201 or 203 operates in one of three operating states, including primary, secondary, and offline. However, only one central processing unit can function in the primary state in control system 200. In the primary state, the central processing unit is running and exchanging I/O data over a remote I/O network to remote IO devices 105 and 107. In the secondary state, the central processing unit is running but is not exchanging I/O data with I/O devices 105 and 107. When the programmable logic controller 101 or 103 changes from primary to secondary or offline, the corresponding network adapter 205 or 207 will swap respective IP addresses. The state of the secondary programmable logic controller automatically transitions to the primary state if the primary programmable logic controller mode leaves the primary state.

The primary programmable logic controller can exit the primary state either due to a hardware failure or a self-check failure. In addition, operator personnel can instruct the control system 200 to change the states programmable logic controllers 101 and 103. However, a programmable logic controller in the offline state cannot enter the primary state without first going through the secondary state. The allowable hot standby state transitions for the control system 200 are:

one programmable logic controller is in the primary state and the other programmable logic controller is in the secondary state one programmable logic controller is in the primary state and the other programmable logic controller is in the offline state both programmable logic controllers are in the offline state Network adapter 205 receives a system status word from CPU (control module) 201 over backplane link 255 while network adapter 207 receives a corresponding system status word from CPU 203 over backplane link 257. Backplane links 255 and 257 are typically wired connections on the backplanes of programmable logic controllers 101 and 103. As described herein, the system status word contains the current standby status of the associated programmable logic controller and the other programmable logic controller.

Network adapters 205 and 207 also exchange information about each other over link 253. While not explicitly shown, link 253 is established through Ethernet network 209.

CPU 201 and CPU 203 may exchange information about each other's states over link 251 (corresponding to link 157 as shown in FIG. 1) so that one of the programmable logic controllers can assume the operation of the primary if a change occurs. With an embodiment of the invention, link 251 comprises a fiber optic link. In addition CPU 201 and CPU 203 interact with each other to agree upon the standby state before the change of state occurs.

With an embodiment of the invention, a network adapter (205 or 207) determines the assigned network address (e.g., where the primary is assigned address=IP and the secondary or offline is assigned address=IP+1). A network adapter determines the assigned address based on an address criterion (which may correspond to an algorithm). For example with first address criterion, the network adapter determines the assigned network address from an address indication provided by the central processing unit. The address indication is indicative of the standby state as agreed by the central processing units 201 and 203. With a second address criterion, the network adapter determines the assigned address according to the standby state of the central processing unit.

Different address criteria may be utilized by different versions of programmable logic controllers. Typically, an old version programmable logic controller supports only the first address criterion while a new version programmable logic controller supports both the first and second address criteria. With an aspect of the invention, when a new version programmable logic controller is mated with an old version programmable logic controller, the new version programmable logic controller utilizes the first address criterion. However, when a new version programmable logic controller is mated with another new version programmable logic controller, the new version programmable logic controller utilizes the second address criterion. With an embodiment of the invention, when bit 12 of the command/status word equals "0", the old algorithm is denoted, while a value of "1" denotes the new algorithm.

With the first address criterion, the value of the assigned network address (e.g., IP address IP or IP+1) is chosen by the network adapter 205 or 207 according to the operational status (current status) of the central processing unit 201 or 203, where the operational status is primary, standby (secondary), or offline. With an embodiment of the invention, the operational status is provided by central processing unit 201 or 203 to corresponding network adapter 205 or 207 over the backplane to the programmable logic controller.

With the first address criterion, network adapters 205 and 207 may both choose the same assigned network address when certain operating, scenarios are encountered. Other operating scenarios may occur in which both programmable logic units 101 and 103 attempt to become the primary when CPU 201 or 203 is not aware of what function the other CPU wishes to assume.

With an operating scenario, network adapters 205 and 207 both choose IP address IP+1, where neither network adapter corresponds to the primary mode according to the first address criterion. In such a case, one of network adapters 205 or 207 goes into a "duplicate IP" mode, where system 200 is not running any mode. Network adapters 205 and 207 may attempt to start with an assigned network address equal to IP+1 according to the offline status of CPU 201 and CPU 203 after a power cycle. The following scenario exemplifies such a case (where "A" corresponds to the initial primary PLC and "B" corresponds to the initial secondary PLC):

A: RUN Primary=>IP
B: RUN Standby=>IP+1
First Action: STOP B
A: RUN Primary=>IP
B: STOP OFFLINE=>IP+1
Second Action: STOP A
A: STOP OFFLINE=>IP
B: STOP OFFLINE=>IP+1
Third Action: Power Cycle A
A: STOP OFFLINE=>IP+1 Fault: Duplicate IP address
B: STOP OFFLINE=>IP+1
Fourth Action: RUN A&B
A: RUN Primary=>IP+1. Network adapter led state: Fault, RUN (Duplicate IP address)
B: RUN Standby=>IP+1

According to a second address criterion, an address indication (e.g., an indication of address IP or IP+1) is sent in a system status word from CPU 201 to network adapter 205 over backplane connection 255 and from CPU 203 to network adapter 207 over backplane connection 257. The address indication is based on a calculated mode, in which CPU 201 and CPU 203 know about the status of the other programmable logic controller and agree upon the network addresses. Flow diagram 600, as discussed herein, provides an embodiment of the network address determination based on the second address criterion.

The following scenario illustrates the network address determination for the second address criterion with the same sequence of actions as with the previously discussed scenario for the first address criterion. In the following scenario, IPAddress denotes the address indication that in contained in the system status word. When IPAddress=0, the calculated network address=IP. When IPAddress=1, the calculated network address=IP+1.

A: RUN Primary=>IPAddress=0
B: RUN Standby=>IPAddress=1
First Action: STOP B
A: RUN Primary=>IPAddress=0
B: STOP OFFLINE=>IPAddress=1
Second Action: STOP A
A: STOP OFFLINE=>IPAddress=0
B: STOP OFFLINE=>IPAddress=1
Third Action: Power Cycle A
A: STOP OFFLINE=>IPAddress=0
B: STOP OFFLINE=>IPAddress=1
Fourth Action: RUN A&B
A: RUN Primary=>IPAddress=0
B: RUN Standby=>IPAddress=1

Figure 3:
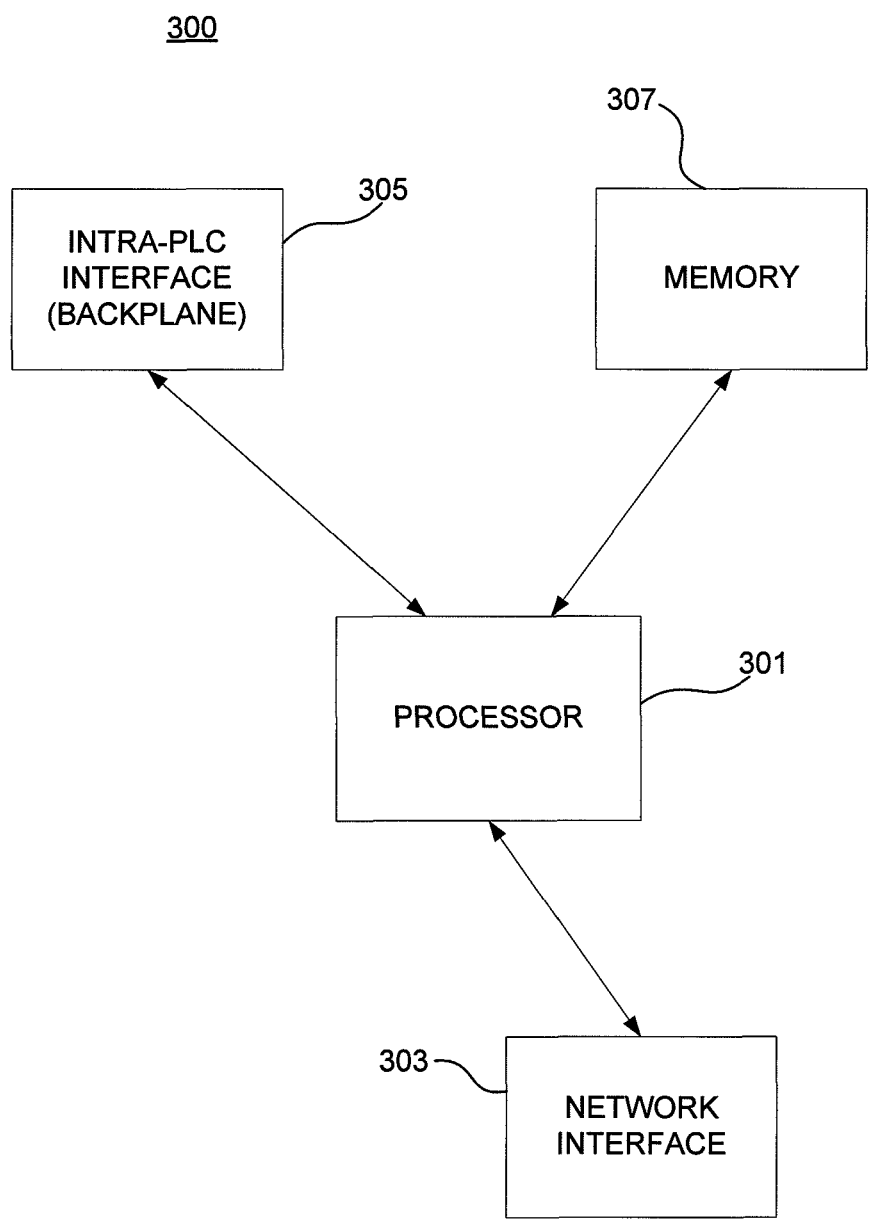
FIG. 3 shows a block diagram of a network adapter according to an embodiment of the invention.

FIG. 3 shows block diagram 300 of network adapter 205 or 207 according to an embodiment of the invention. Network adapter 300 includes processor 301 that interacts with the associated CPU (e.g., CPU 201 or CPU 203) over backplane connection 255 or 257 through backplane (intra-PLC) interface 305. Processor 301 processes a system status word received from the CPU and determines the assigned network address of network interface 303 according to the first or second address criterion. Network adapter 300 also interacts with the other network adapter in order to exchange information, as discussed herein. With an embodiment, user datagram protocol (UDP) messages are sent between network adapters 205 and 207 over link 253.

Figure 4:
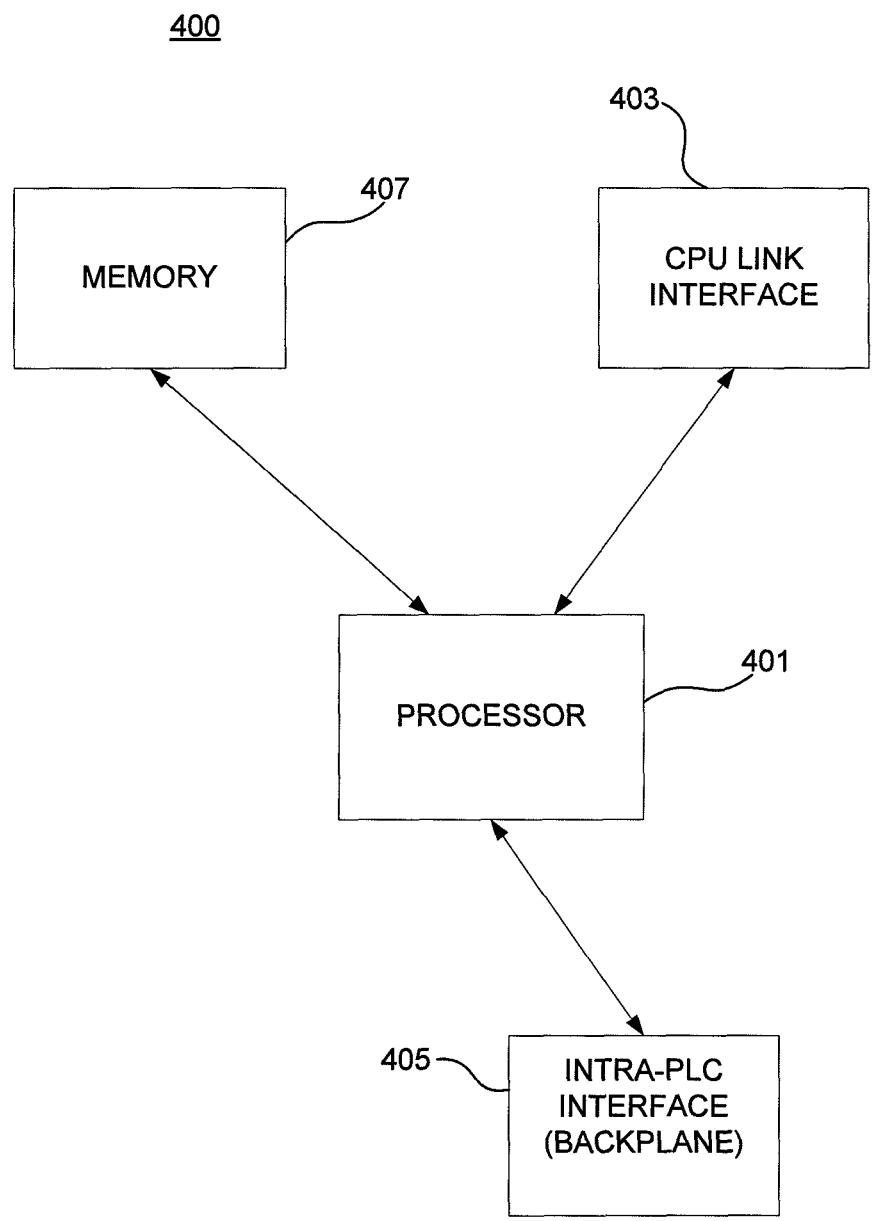
FIG. 4 shows a block diagram of a central processing unit according to an embodiment of the invention.

FIG. 4 shows block diagram 400 of central processing unit 201 or 203 according to an embodiment of the invention. CPU 400 includes processor 401 that interacts with the associated network adapter (e.g., network adapter 205 or network adapter 207) over backplane connection 255 or 257 through backplane interface 405. Processor 401 determines a system status word from information received from the other CPU through CPU link interface 403 over link 251 and information received from the associated network adapter. With an embodiment of the invention, a combination of bits 12 and 13 is used to determine the IPAddress in the system status word. When bit 12 equals "0", the old algorithm is denoted and bit 13 is not valid. However, when bit 12 equals "1", the new algorithm is denoted and the primary IP address is denoted when bit 13 equals "0" while the standby address IP+1 is denoted when bit 13 equals "1".

Embodiments of the invention may include forms of computer-readable media. Computer-readable media include any available media that can be accessed by a computing device 301 or 401 from memory 307 or memory 407, respectively. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. Aspects of the method steps disclosed herein may be executed on a processor on a computing device 301 or 401. Such a processor may execute computer-executable instructions stored on a computer-readable medium.

FIG. 5 shows system status word 500 sent from central processing unit 201 or 203 to network adapter 205 or 207 of a programmable logic controller according to an embodiment of the invention. The network adapter utilizes either the first address criterion or the second network criterion based on IsIPValid field 501 (corresponding to a selection indication). When field 501 is equal to 0, the network adapter utilizes the first address criterion. When field 501 is equal to 1, the network adapter utilizes the second address criterion. With the embodiment shown in FIG. 5, IsIPValid field 501 is set when equal to "1". However, embodiments of the invention may use other values to designate when the field is set.

With the first address criterion, the network adapter uses the operational status of the corresponding CPU. Referring to system status word 500, bits 0 and 1 (ThisPLCMode) indicate that the associate programmable logic controller is primary, standby (secondary), or offline when equal to "10", "11', or "01", respectively. Network adapter 205 or 207 determines that the network address is equal to IP when the operation status is primary and equal to IP+1 when the operational status is standby or offline.

With the second address criterion, the network adapter uses IPAddress field 503 (corresponding to an address indication) in system status word 500. When field 503 equals "0", the network adapter determines that the assigned network address is equal to IP. When field 503 equals "1", network adapter 205 or 207 determines that the assigned network address is equal to IP+1.

With an embodiment of the invention, network adapter 300 utilizes the following pseudo-code:

```
switch (new information in bits 13 and 12)
{
case: bit 12 is 0 and bit 13 is 1
case: bit 12 is 0 and bit 13 is 0
use the first address criterion
break;
case: bit 12 is 1 and bit 13 is 0
use the second address criterion: perform change of IP address to primary
state with extra system level information.
```

-continued

```
break;
case: bit 12 is 1 and bit 13 is 1
use the second address criterion: perform change of IP address to
secondary state with extra system level information.
break;
}
```

Figure 6:
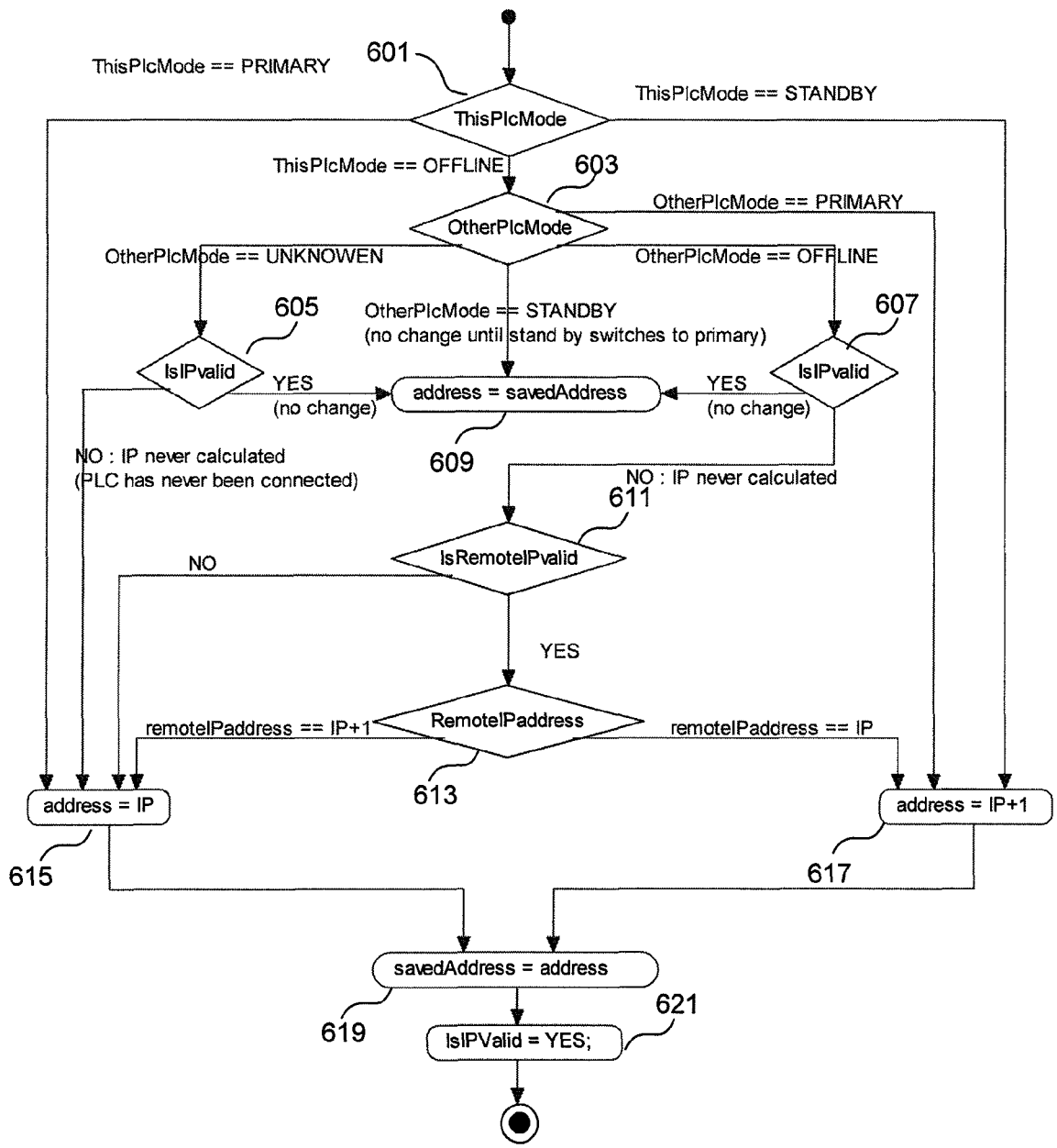
FIG. 6 shows a flow diagram for determining the network address associated with a programmable logic controller according to an embodiment of the invention.

FIG. 6 shows flow diagram 600 for calculating the network address associated with a programmable logic controller according to an embodiment of the invention. (In the embodiment shown in FIG. 6, a condition is set when the logic value is "YES" and not set when the logic value is "NO".) With an embodiment of the invention, flow diagram is executed by CPU 201 or CPU 203. Network adapter 205 or 209 executes an algorithm corresponding to flow diagram 600 each time the status of the programmable logic controller changes or at startup. In step 601, if the operational status (ThisPLCMode corresponding to bits 0 and 1 in system status word 500) is primary, the IPAddress (field 503 of system status word 500) is equal to IP in step 615. If the operational status is standby, the IPAddress is equal to IP+1 in step 617. If the operational status is offline, then step 603 is executed to determine the operational status (OtherPLCMode corresponding to bits 2 and 3 of system status word 500) of the other programmable logic controller. If the other operational status is primary, then IPAddress 503 is equal to IP+1 in step 617. If the other operational status is offline and IsIPValid (corresponding to field 501 in system status word 500) is set (as determined by step 607), then the IPAddress remains the same in step 609. If the operational status of the other programmable logic controller is unknown, as determined by step 603, then step 605 determines whether IsIPValid is set. If not, then the IPAddress is equal to IP in step 615. Otherwise, the IPAddress remains the same in step 609.

Referring to step 607, if IsIPValid is not set, step 611 is executed to determine whether IsRemoteIPValid (corresponding to field 501 for the other CPU which may be conveyed over link 251 as shown in FIG. 2) is set. If IsRemoteIPValid is not set, then the IPAddress is equal to IP. Otherwise, step 613 determines the RemoteIPAddress (corresponding to field 503 for the other CPU which may be conveyed over link 251). If the RemoteIPAddress equals IP+1, then the IPAddress is equal to IP in step 615. If the RemoteIPAddress equals IP, then the IPAddress equals IP+1 in step 617. If steps 615 or 617 are executed, the IPAddress is saved and IsIPValid is set in steps 619 and 621.

Figure 7:
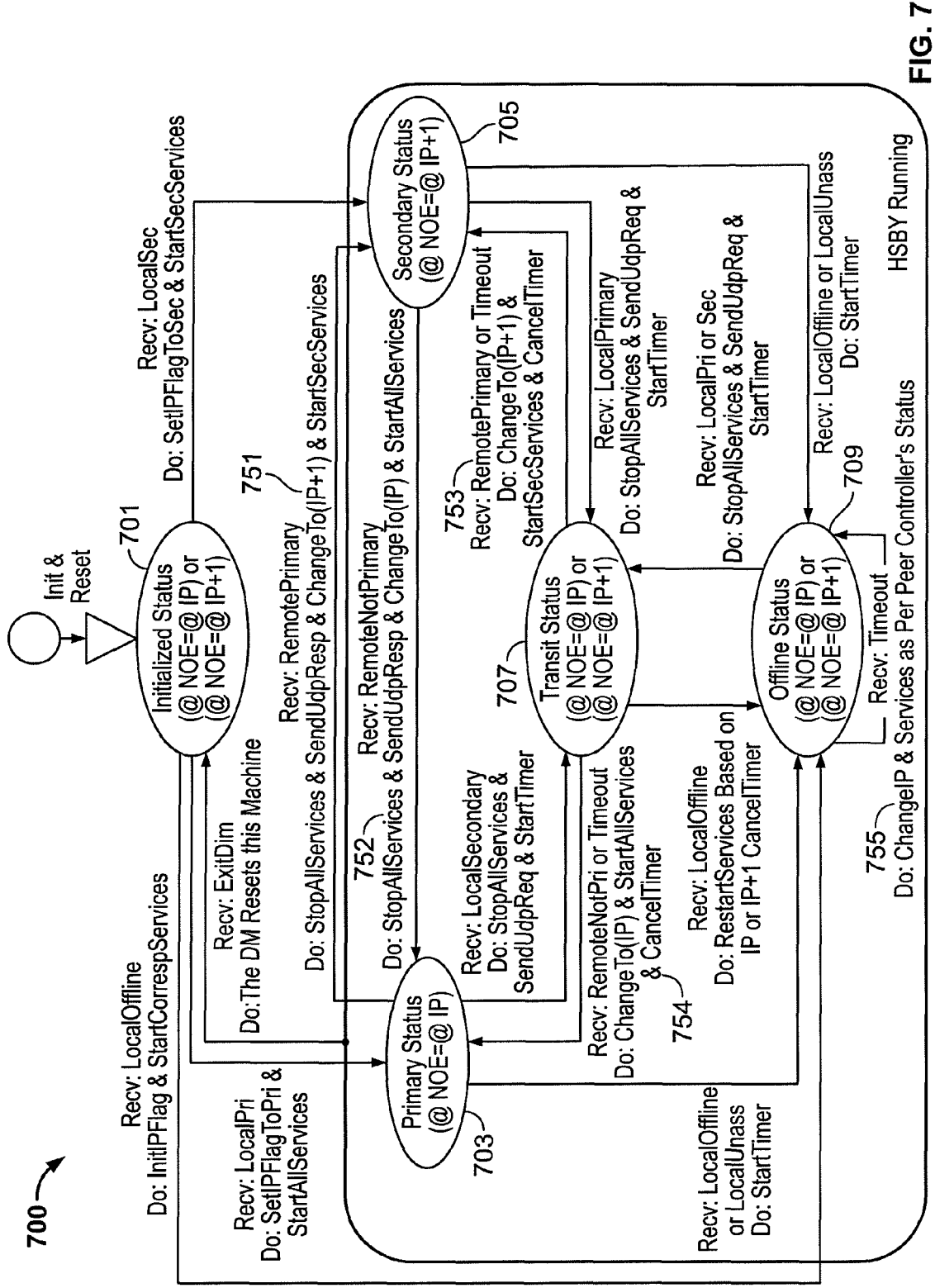
FIG. 7 shows a state diagram for a programmable logic controller according to an embodiment of the invention.

FIG. 7 shows state diagram 700 for a programmable logic controller according to an embodiment of the invention. State diagram 700 represents states for network adapter 205 or 207 for determining the assigned network address. States include state 701 (PLC is in the power up mode), state 703 (PLC is primary), state 705 (PLC is standby), state 707 (PLC is in a temporary state while the actual state is being determined), and state 709 (PLC is not operational). State diagram 700 incorporates flow diagram 600 for calculating the assigned network address when the assigned network address changes corresponding to transitions 751-755.

FIG. 8 shows messaging scenarios 800 between network adapters in an active standby system according to an embodiment of the invention. With scenario 803, network adapters 205 and 207 exchange status information over link 253 using an UCP/IP protocol. Status information includes information about I/O health and cabling information. With the cabling information, the CPU is able to detect whether redundant cabling is missing; otherwise, both programmable logic controller may attempt to become the primary. With an embodiment of the invention, the primary and standby systems are linked together with redundant cabling. With redundant cabling, there are typically two independent links that provide the same information. In case one channel fails, communication is achieved on the second channel.

With scenarios 801 and 807, the primary network adapter reports to the associated CPU that the standby unit has failed. With scenarios 805 and 809, the standby network adapter waits for the associated CPU to send a command to become the primary as indicated in the system status word. Accordingly, the network adapter changes the assigned network address to IP+1. Scenario 811 corresponds to the case in which both programmable logic controllers are offline. No action is taken by the network adapter.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A first programmable logic controller, comprising:
 a first central processing unit configured to:
  determine a first operational status of the first programmable logic controller;
  communicate with a second programmable logic controller for obtaining a second operational status of the second programmable logic controller;
  if the first operational status is a primary state, then set an address indication to a first address;
  if the first operational status is a standby state, then set the address indication to a second address;
  if the first operational status is an offline state, then determine a calculated mode of operation of the first programmable logic controller from the first operational status and the second operational status, and set the address indication based on the calculated mode of operation; and
  determine a selection indication; and
 a first network adapter configured to:
  receive, from the central processing unit, the address indication, the selection indication, and an indication of the first operational status;
  if the selection indication is set to a first state, determine an assigned Internet Protocol (IP) address to be the address of the address indication, and
  if the selection indication is set to a second state, determine the assigned IP address based on the first operational status; and
  configure the first network adapter with the assigned IP address.

2. The first programmable logic controller of claim 1, wherein:
 the first network adapter is configured to communicate with a second network adapter of the second programmable logic controller, obtain a mated status of the second network adapter, and send the mated status to the first central processing unit.

3. The first programmable logic controller of claim 2, wherein:
 the first central processing unit is configured to utilize the mated status in determining the calculated mode of operation.

4. The first programmable logic controller of claim 1, wherein the first programmable logic controller is configured to operate with the second programmable logic controller in a warm standby mode.

5. The first programmable logic controller of claim 1, wherein the first programmable logic controller is configured to operate with the second programmable logic controller in a hot standby mode.

6. The first programmable logic controller of claim 1, wherein the first programmable logic controller is configured to operate with the second programmable logic controller in a cold standby mode.

7. The first programmable logic controller of claim 1, wherein the first central processing unit is configured to communicate with a second central processing unit of the second programmable logic controller and wherein the first central processor unit is configured to be in agreement with the second central processor unit when determining the calculated mode of operation.

8. The first programmable logic controller of claim 7, wherein the first central processing unit is configured to utilize a previous information transfer from the second central processing unit when the second central processing unit malfunctions.

9. The first programmable logic controller of claim 1, wherein the network comprises an Ethernet network.

10. The first programmable logic controller of claim 1, wherein the first programmable logic controller is configured to determine a compatibility with the second address criterion and determine the selection indication based on the compatibility.

11. A first network adapter, comprising:
 a non-transitory memory configured to store computer executable instructions;
 a network interface configured to communicate with a device over a network, wherein the network interface is assigned an assigned Internet Protocol (IP) address; and
 a processor configured to control operation of the first network adapter, the processor configured to execute the computer executable instructions stored in the memory, the computer executable instructions when executed being configured to cause the processor to perform:
  receiving, from a central processing unit of a programmable logic controller, an address indication identifying a particular IP address, wherein the first network adapter is located in the programmable logic controller;
  receiving, from the central processing unit, an address indication, and indication of an operational status of the programmable logic controller, and a selection indication;
  if the selection indication is set to a first state, determining the assigned IP address to be the particular IP address identified by the address indication; and
  if the selection indication is set to a second state, determining the assigned IP address based on the operational status; and
  configuring the network interface with the assigned IP address.

12. The first network adapter of claim 11, wherein:
 the first network adapter is configured to communicate with a second network adapter of a mated programmable logic controller, obtain a mated status of the second network adapter, and send the mated status to the central processing unit.

13. The first network adapter of claim 11, wherein the network comprises an Ethernet network.

14. An industrial automation system comprising:
a first programmable controller including:
   a first central processing unit; and
   a first network adapter; and
a second programmable controller including:
   a second central processing unit configured to:
      determine a second operational status of the second programmable logic controller;
      communicate with the first programmable logic controller to obtain a first operational status of the first programmable logic controller;
      determine a calculated mode of operation of the second programmable logic controller from the first operational status and the second operational status;
      determine a first Internet Protocol (IP) address based on the calculated mode of operation, wherein either the first programmable logic controller or the second programmable logic controller is capable of functioning as a primary controller; and
      determine a selection indication; and
   a second network adapter configured to:
      receive, from the second central processing unit, an indication of the first IP address, an indication of the second operational status, and the selection indication;
      if the selection indication is set to a first state, determine an assigned IP address to be the first IP address;
      if the selection indication is set to a second state, determine the assigned IP address based on the second operational status; and
      configure the second network adapter with the assigned IP address.

15. The industrial automation system of claim 14, wherein:
the second network adapter is configured to communicate with the first network adapter of the first programmable logic controller, obtain a mated status of the first network adapter, and send the mated status to the second central processing unit.

16. The industrial automation system of claim 15, wherein:
the second central processing unit is configured to utilize the mated status in determining the calculated mode of operation.

17. The industrial automation system of claim 14, wherein the first programmable logic controller is configured to operate with the second programmable logic controller in a warm standby mode.

18. The industrial automation system of claim 14, wherein the first programmable logic controller is configured to operate with the second programmable logic controller in a hot standby mode.

19. The industrial automation system of claim 14, wherein the first programmable logic controller is configured to operate with the second programmable logic controller in a cold standby mode.

20. The industrial automation system of claim 14, wherein the first central processing unit is configured to communicate with a second central processing unit of the second programmable logic controller and wherein the first central processor unit is configured to be in agreement with the second central processor unit when determining the calculated mode of operation.

21. The industrial automation system of claim 14, wherein the first and second central processing units are configured to communicate with each other via an Ethernet network.

22. A non-transitory computer-readable storage medium storing computer-executable instructions that, when executed, are configured to cause a processor to perform a method comprising:
   receiving an indication of a particular Internet Protocol (IP) address based on a calculated operational mode of operation of a first programmable logic controller;
   receiving a selection indication;
   receiving an indication of an operational status of the first programmable logic controller;
   if the selection indication is set to a first state, determining an assigned IP address to be the particular IP address;
   if the selection indication is set to a second state, determining the assigned IP address based on the indicated operational status; and
   configuring a first network adapter of the first programmable logic controller with the assigned IP address.

23. The non-transitory computer-readable storage medium of claim 22, further comprising:
   communicating with a second network adapter of a second programmable logic controller;
   obtaining a status of the second network adapter; and
   sending the status to a central processing unit of the first programmable logic controller.

* * * * *